Sept. 12, 1950 L. R. KUBIAS 2,521,857
TURN SIGNALING DEVICE
Filed March 16, 1949
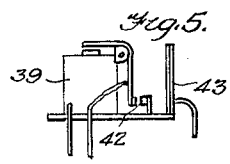
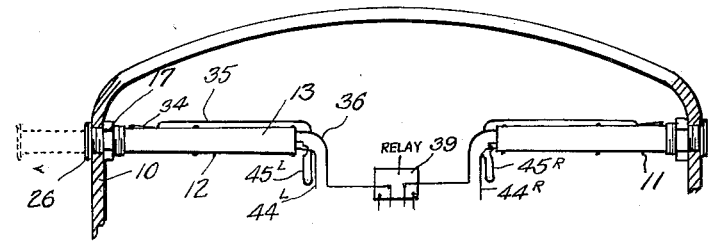
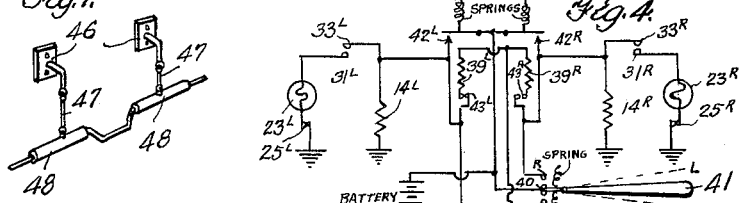
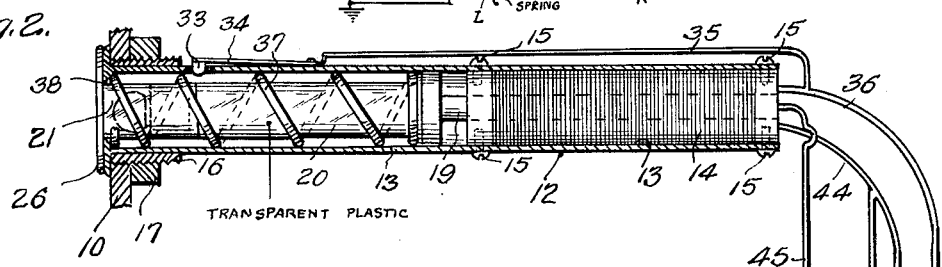
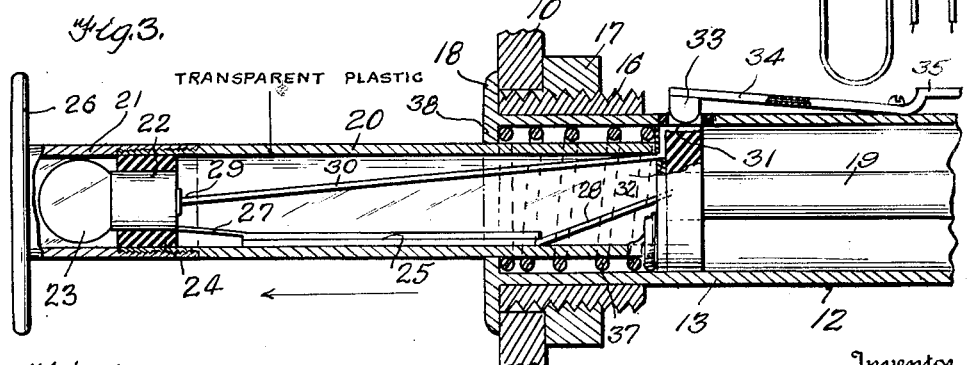
Inventor
LILLIAN R. KUBIAS
HER ATTY.

Patented Sept. 12, 1950

2,521,857

UNITED STATES PATENT OFFICE 2,521,857

TURN SIGNALING DEVICE

Lillian R. Kubias, Cedar Rapids, Iowa

Application March 16, 1949, Serial No. 81,647

2 Claims. (Cl. 177—329)

This invention relates to a turn signaling device for automobiles and other vehicles.

One of the important objects of this invention is the production of a simple and efficient means for signaling the direction of turn of a vehicle, said means including extensible transparent illuminated arms which may be readily mounted in position and easily operated from a location adjacent the steering wheel of the vehicle upon which the signaling device is mounted.

A further object of this invention is the production of a simple and efficient transparent signaling arm which is so constructed as to be moved laterally of the vehicle upon which it is mounted to signal the direction of turn, and to automatically illuminate the arm when the arm is in an extended position, the operation of the arm being controlled by a properly located switch.

Other objects and advantages of the present invention will appear throughout the following specification and claims.

In the drawing:

Figure 1 is a fragmentary vertical sectional view of the front portion of an automobile, showing the signaling arms mounted in position, the actuating electrical circuit being shown in diagram;

Figure 2 is a longitudinal sectional view of the casing, and one of the signaling arm assemblies, the signaling means being shown in elevation and in a retracted position;

Figure 3 is a fragmentary longitudinal sectional view of one of the signaling arms, the signaling means being shown in an extended signaling position;

Figure 4 is a diagrammatic view of the electrical circuit for controlling the signaling mechanism;

Figure 5 is a side elevational view of the relay used in the electrical circuit;

Figure 6 is a top plan view of the actuating switch box and switch arm;

Figure 7 is a perspective view of a lead supporting means which is preferably used as a hanger for supporting the wires of the electrical circuit which wires extend from one element in the circuit to another.

By referring to the drawing, it will be noted that 10 designates the body of the vehicle upon which the signaling means is mounted, preferably the cowling between the front door and the hood of the vehicle. It should be understood that the signal may, however, be mounted in any desired location upon the vehicle to obtain the desired results, without departing from the spirit of the invention. The invention embodies two signaling assemblies 11 and 12, one mounted upon the right side of the body 10 and the other on the left, as shown in Figure 1. These signaling assemblies are of identical construction, and therefore it will be necessary to describe only one in detail.

As shown in Figures 2 and 3, each signaling assembly comprises a hollow tube or casing 13, preferably brass or other suitable material, of a suitable length, diameter and thickness. A solenoid coil 14 of suitable size and construction is fastened in the inner end of the tube 13 by means of the anchoring screws 15. The solenoid coil 14 is of a suitable construction to allow it to be energized by the power supply of the vehicle upon which the signaling device is mounted. The outer end of the tube or casing 13 is firmly fastened to a surrounding metal collar 16 which collar is fixed to the tube 13 in any desired manner. The collar 16 is externally threaded and extends through the body 10, as shown in detail in Figure 3. A nut 17 is threaded upon the collar 16 and abuts the inner face of the wall of the body 10. An outer flange 18 is carried by the outer end of the casing or tube 13 and abuts the outer face of the wall of the body 10. The nut 17 firmly clamps the wall of the body 10 between the flange 18 and the nut 17 to lock and firmly support the tube 13 upon the body 10 and provide a support therefor. Any suitable means may be provided for attaching the tube 13 to the body 10, without departing from the spirit of the invention.

A plunger or core 19 passes longitudinally through the center of the solenoid 14 and is made of suitable metal so that the plunger 19 will be ejected from one end of the coil 14 when the coil 14 is energized from the power supply. A hollow transparent signal tube 20 preferably plastic, is fixed to the outer end of the plunger 19, and this tube 20 carries a removable cap 21 of transparent material, plastic or the like. The cap 21 is preferably threaded upon the outer end of the signal tube 20, as shown in Figure 3. A conventional bulb socket 22 is carried at the outer end of the tube 20, and a removable electrical bulb 23 of the conventional type is carried by this socket 22. The socket 22 is firmly anchored in position by the supporting ring 24 formed of plastic or similar material.

A thermostat element comprising a bi-metallic strip 25 of proper dimension, size and capacity to break its normally closed contacts approximately once each second upon being energized by the power supply, is fastened to one side of the inner face of the tube 20, as shown in Figure 3, This strip 25 is of the conventional type to provide the conventional make-and-break contact for a flash bulb signal. The cap 21 carries a disc 26 at its outer end which overlies the flange 18 of the tube 13 when the signal is in a retracted position. This structure protects the interior of the signals from the effects of weather.

One contact of the lamp socket is connected to one contact of the bi-metallic strip 25 by means of a conducting connection 27, and the other end of the strip 25 is connected to the end of the metal solenoid plunger 19 by a suitable conduction connection 28, as shown in Figure 3. The opposite contact of the lamp socket 22 at 29, is connected by a conducting strip 30, formed of copper or other suitable material, to a suitable copper or other segment or commutator 31. This commutator 31 preferably is embedded in the inner flange 32 of the plastic tube 20, as shown in Figure 3. This commutator 31 extends flush with the periphery of the flange 32 and is adapted to close an electrical circuit with the contact tip 33, which is carried by the spring arm 34 mounted on the outside of the tube 13 when the parts are in registering position. This spring conducting arm 34 constitutes an extension of the conductor strip 35, which extends longitudinally of the tube or casing 13 and is in turn connected to the current supply wire 36. The wire 36 is also connected to the winding of the solenoid 14, as shown in Figure 2. The contact 33 provides a means for forming a contact without the necessity of employing flexible leads along the casing or tube. The contact 33, arm 34, and lead 35, are suitably insulated in the conventional manner.

A coil spring 37 of proper size and pressure is carried in the outer end of the tube 13 opposite the solenoid 14. The spring is interposed between the flange 32 of the signal tube 20 and the outer abutment 38 of the casing or tube 13 to normally return the tube 20 to a retracted position within the tube 13 as soon as the solenoid 14 is de-energized. When the solenoid 14 is energized, the signal tube 20 will be moved to an extended position shown in Figure 3, thereby compressing the spring 37. As soon as the solenoid 14 is de-energized the spring 37 will expand and return the solenoid plunger 19, which is fixed to the flange 32, to a retracted position in the casing or tube 13 and thereby withdraw the tube 20 to a retracted position within the tube 13, at the same time cutting off flow of the electrical current from the lamp bulb 23 due to the breaking of the connection between the elements 31 and 33.

An auxiliary relay 39 and an actuating switch 40 shown in detail in Figures 5 and 6, are necessary or important for correct operation of the signals, and the operation of which is as follows:

As shown in Figure 5, a second bi-metallic strip 43 in the nature of a thermostat element is connected in series, with one side of the contacts 42, and the other side of the contact 42 is connected in series with the magnet of the relay. The thermostat element 43, when the magnet of the relay is energized, does not open its contacts for approximately ten to fifteen seconds and provides a periodically delayed contact. Consequently, when the relay 39 is operated, the signal is energized even though the switch 40 is only momentarily closed. When the bi-metallic strip 43 on the relay has been energized for the proper length of time, its contacts open, thereby de-energizing the relay and the signal solenoid 14. The coil spring 37 will then return the plunger 19 of the signal 12 to its retracted position as the spring 37 expands. The signal 12 will then be ready for a second operation. When the signal 11 to the right of the vehicle is to signal a right hand turn, the switch arm 41 is swung in the opposite direction for actuating the signal 11. The flexible lead or return wire 44 of the solenoid 14 which is grounded on the frame allows the current to pass from the lead or wire 36 which is connected to the power system or battery and back to the ground connection after the proper switch is actuated. The core 19 is connected to the wire or ground lead by means of the flexible lead 45.

Figure 4 is a diagram of the electrical circuit of the two signaling devices. Switch 40 is a single pole, double throw, spring return, toggle switch of the three position type of such design that the switch handle is normally in the center position with both positions of the switch normally open. The handle 41 of the switch 40 is, of course, insulated from the contacts carried by the center arm.

By referring to Figure 4, it will be seen that the action of the signaling device is as follows:

When the switch arm or handle 41 is depressed in, for example, the downward position the center contact is closed against the upper contact R. This allows the current from the battery or other power supply to flow through the center contact, thence through the upper contact R and through bi-metallic strip $43^R$, through the coil of relay $39^R$ and back to the other side of the battery for power supply, which is grounded. The current also flows through relay contact $42^R$, and through the movable contact of relay $39^R$ which has been closed by the action of relay $39^R$ being energized, thus "sealing-in" relay $39^R$ so that it is continually energized even though switch handle 41 is returned to its center position.

The current through the upper contact R of switch 40 also flows through solenoid $14^R$ and thence to ground, which is the other side of the power supply, thus energizing the signaling device, and forcing the solenoid plunger out of the solenoid coil. The current also flows through contact $33^R$ and commutator $31^R$, thence through the signaling lamp $23^R$ and through the bi-metallic strip $25^R$, and returns to the grounded side of the power supply. Bi-metallic strip $25^R$ with its short reaction time of approximately one-half to one second flashes lamp $23^R$ at a steady rate. When bi-metallic strip $43^R$ has reacted within a ten or fifteen second interval, its contacts open, thus opening the coil circuit to relay $39^R$ and allowing the contact $42^R$ to drop out. Thus, the device is ready for another operation.

The action of the left signal is identical with that of the right signal except that the handle 41 of switch 40 is moved to the opposite direction or in the position indicated by L in the diagram. This allows current from the battery to flow through the center contacts of switch 40 through contact L then through bi-metallic strip $43^L$, through relay coil $39^L$ and back to the other side of the battery. Current also flows through contact $42^L$ which has been closed by the action of current flowing through relay coil $39^L$, thus sealing-in the relay. Current also flows through solenoid $14^L$ and back to the other side of the power supply. Current also flows through contact $33^L$ and commutator $31^L$ which have been brought together by the action of the solenoid $14^L$ forcing the plunger out of the solenoid. Current then flows through lamp $23^L$ and through bi-metallic strip $25^L$, and to the other side of the power supply. Bi-metallic strip 25L flashes the signal lamp at one-half to one second intervals, approximately, and after a ten or fifteen second interval from the initiation of this sequence, bi-metallic strip 43L opens, thus allowing relay 39L to drop out and setting up the circuit for another operation.

Numerical designation for the various components follow the numerical designation on the drawing. The letters R and L designate the similar parts of the right and left signaling devices respectively.

For the purpose of supporting the various lead wires in the circuit, I preferably provide suitable hangers 46 placed at suitable locations upon the body of the vehicle or other support. These hangers 46 suspend link rods 47 which in turn suspend suitable hollow tubes 48 through which the leads extend.

It should be understood that certain detail changes in the construction of the device may be employed without departing from the spirit of the invention, so long as such changes fall within the scope of the appended claims.

Having described the invention, what I claim as new is:

1. A turn signaling device for vehicles comprising a hollow casing, a hollow transparent signal tube slidably mounted in said casing, a solenoid coil fixed in one end of said casing, a plunger slidable in said solenoid, electrical means for actuating said solenoid to move said plunger outwardly of the solenoid to a display position, means connecting the outer end of said plunger to the inner end of said transparent signal tube, a support for said casing, a spring engaging abutment carried by said support and the outer end of said casing, said transparent signal tube being slidably mounted through said abutment, an expansion coil spring encircling said signal tube within the casing and interposed between said abutment and said plunger to normally hold the plunger and signal tube in a retracted position within said hollow casing, a transparent removable cap carried by the outer end of said transparent tube, a removable electric bulb in said cap, means for illuminating said bulb, means carried by said cap and abutting said abutment when the signal tube is in a retracted position and sealing the outer end of the casing and constituting a weather seal therefor when the signal tube is in a retracted position, and the removable cap permitting access through the outer end of the signal tube to facilitate replacement of the electric bulb.

2. A turn signaling device for vehicles comprising a hollow casing, a hollow transparent signal tube slidably mounted in said casing, a solenoid coil fixed in one end of said casing, a plunger slidable in said solenoid, electrical means for actuating said solenoid to move said plunger outwardly of the solenoid to a display position, means connecting the outer end of said plunger to the inner end of said transparent signal tube, a support for said casing, a spring engaging abutment carried by said support and the outer end of said casing, said transparent signal tube being slidably mounted through said abutment, an expansion coil spring encircling said signal tube within the casing and interposed between said abutment and said plunger to normally hold the plunger and signal tube in a retracted position within said hollow casing, a transparent removable cap carried by the outer end of said transparent tube, a removable electric bulb in said cap, means for illuminating said bulb, a sealing disc carried by said cap and abutting said abutment when the signal tube is in a retracted position and sealing the outer end of the casing and constituting a weather seal therefor when the signal tube is in a retracted position, the removable cap permitting access through the outer end of the signal tube to facilitate replacement of the electric bulb, and contact means carried by said casing and signal tube for automatically illuminating said bulb when said signal tube reaches an extended and display position.

LILLIAN R. KUBIAS.

REFERENCES CITED

The following references are of record in the file of this patent:

UNITED STATES PATENTS

| Number | Name | Date |
| --- | --- | --- |
| 1,224,657 | Miller et al. | May 1, 1917 |
| 1,409,135 | Rosiers et al. | Mar. 7, 1922 |
| 1,437,086 | Bater et al. | Nov. 28, 1922 |
| 2,052,105 | Murguiondo | Aug. 25, 1936 |
| 2,094,514 | Zika et al. | Sept. 28, 1937 |
| 2,122,508 | Bell | July 5, 1938 |